(No Model.) 2 Sheets—Sheet 1.

F. KEPP.
MOLDING MACHINE.

No. 576,679. Patented Feb. 9, 1897.

Witnesses:
Albert York Smith
Frank W. Smith

Inventor
Ferdinand Kepp.
By J. N. Cooke
Attorney.

(No Model.) 2 Sheets—Sheet 2.
F. KEPP.
MOLDING MACHINE.
No. 576,679. Patented Feb. 9, 1897.
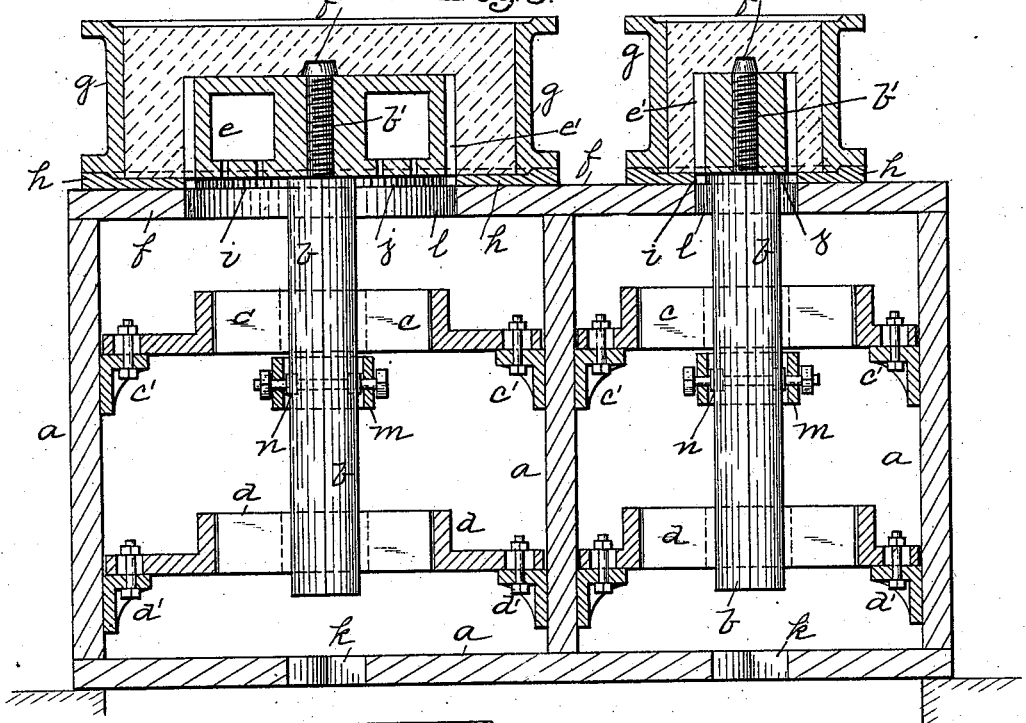
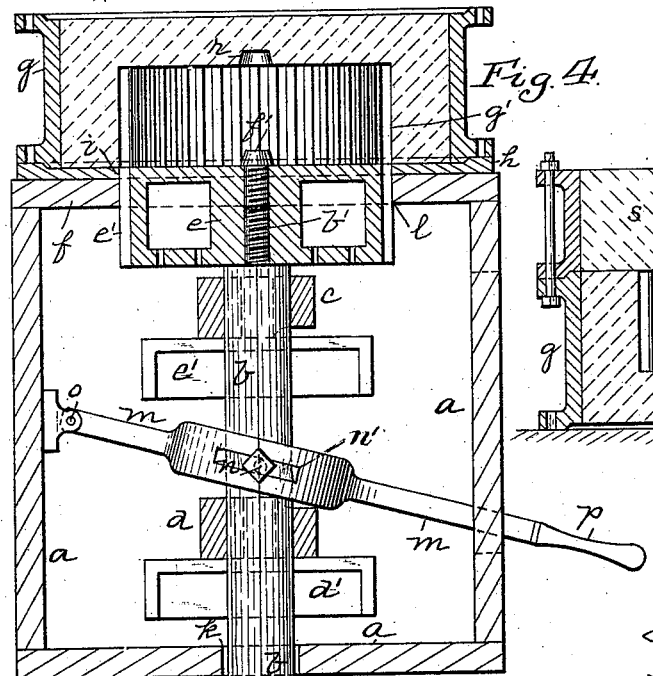
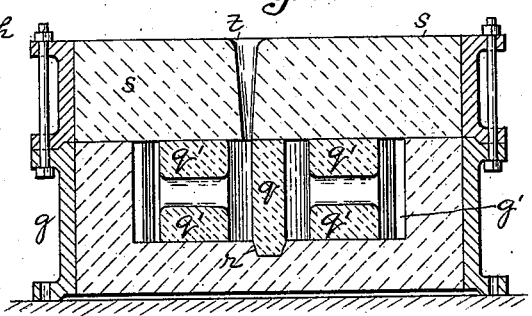
Witnesses:
Albert York Smith
Frank M. Smith
Inventor:
Ferdinand Kepp.
By J. N. Cooke
Attorney.

UNITED STATES PATENT OFFICE.

FERDINAND KEPP, OF ALLEGHENY, PENNSYLVANIA, ASSIGNOR TO THE KEPP GEAR WHEEL AND FOUNDRY COMPANY, OF SAME PLACE.

MOLDING-MACHINE.

SPECIFICATION forming part of Letters Patent No. 576,679, dated February 9, 1897.

Application filed October 23, 1894. Serial No. 526,682. (No model.)

*To all whom it may concern:*

Be it known that I, FERDINAND KEPP, a resident of Allegheny, in the county of Allegheny and State of Pennsylvania, have invented a new and useful Improvement in Molding Apparatus; and I do hereby declare the following to be a full, clear, and exact description thereof.

My invention relates to molding apparatus, and has special reference to sand-molding apparatus for the manufacture of gear-wheels, pinions, &c.

The object of my invention is to provide a sand-molding apparatus in which the molds can be quickly and accurately made.

My invention consists, generally stated, in a molding apparatus, the combination of a stationary molding-table for supporting the flask, a plunger mounted within the stationary molding-table and carrying the pattern at its upper end, and means connected to said plunger for raising and lowering the pattern above and below the molding-table.

It also consists in certain other improvements and combinations of parts, all of which will be more fully hereinafter set forth and claimed.

To enable others skilled in the art to make and use my invention, I will describe the same more fully, referring to the accompanying drawings, in which—

Figure 1:
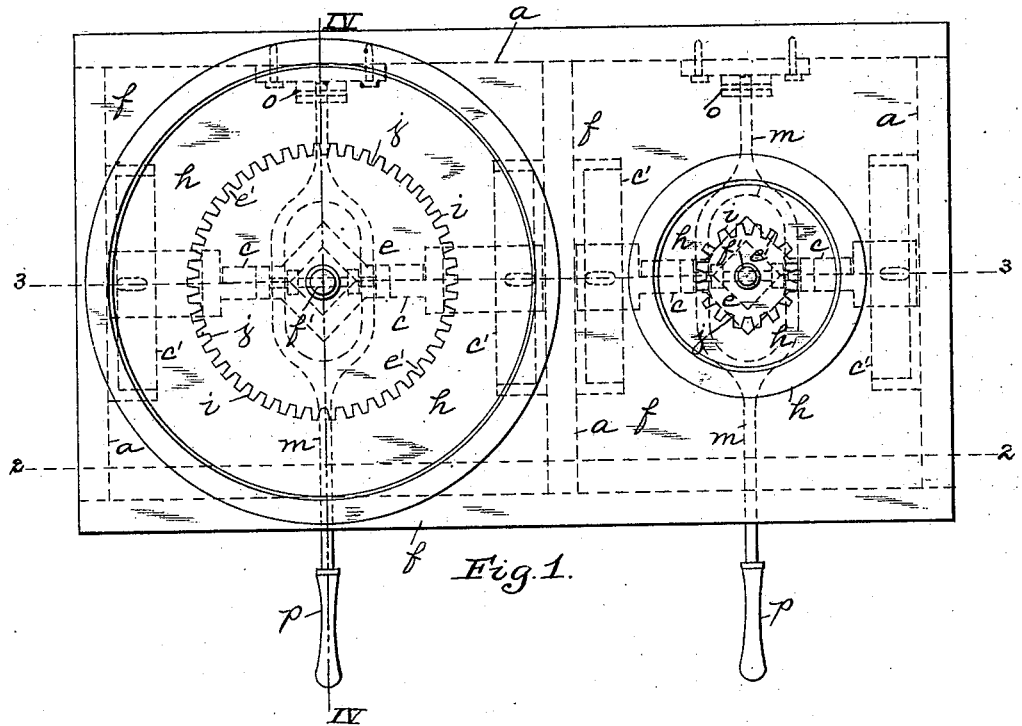
Figure 2:
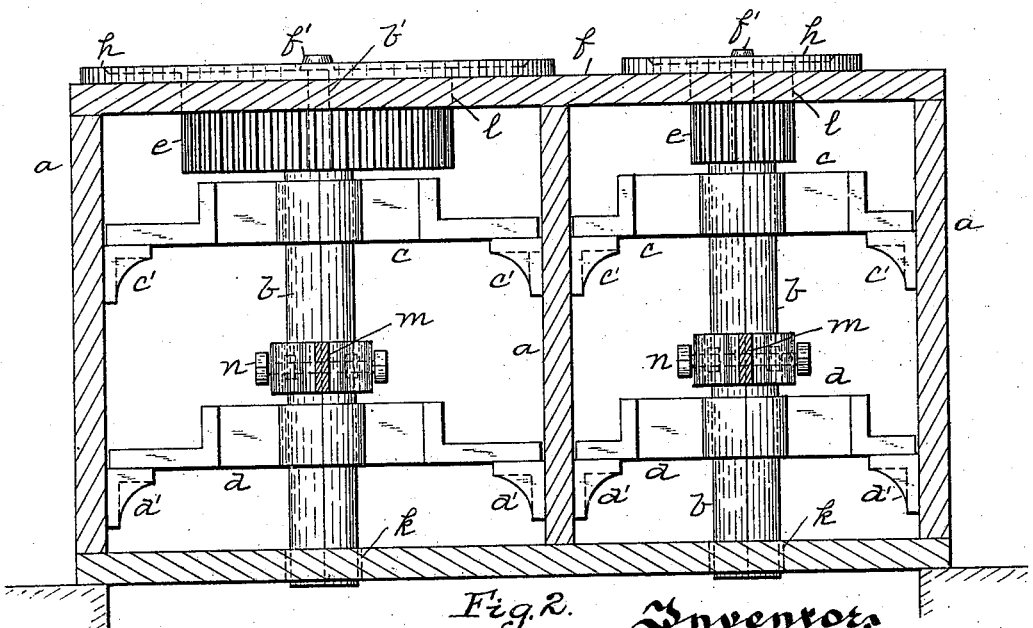

Figure 1 is a plan view of my improved molding apparatus. Fig. 2 is a longitudinal section on the line 2 2, Fig. 1, showing the pattern in its lowest position. Fig. 3 is a longitudinal central section on the line 3 3, Fig. 1, showing the pattern in its raised position for forming the mold. Fig. 4 is a partial central cross-section on the line 4 4, Fig. 1, showing the finished mold and the pattern withdrawn from the flask; and Fig. 5 is a view of the mold ready for casting.

Like letters here indicate like parts in each of the figures of the drawings.

My invention is illustrated in connection with the manufacture of gear-wheels and pinions, as these articles, on account of their construction, are exceedingly difficult to form and require a great deal of time and accuracy. On the left of the apparatus is shown the manufacture of gear-wheels and on the right is shown the manufacture of pinions, the two devices being practically the same, and the description of one will answer for both. Mounted within the frame $a$ is the plunger $b$, which is preferably formed square in cross-section and slides within the guides $c\ d$, which rest upon and are bolted to the brackets $c'\ d'$, secured to the frame $a$. The plunger $b$ has the contracted threaded portion $b'$ at its upper end for the reception of the gear-pattern $e$, said pattern $e$ being held securely to the plunger $b$ by means of the nut $f'$ screwing onto the threaded portion $b'$ and against the pattern.

The frame $a$ is provided with the molding-table $f$ for supporting the flask $g$, said flask $g$ resting upon the stripping-plate $h$, rigidly secured to the molding-table $f$, the said stripping-plate $h$ acting to support the flask $g$ during the formation of the mold. The stripping-plate $h$ has the opening $i$ for the passage of the gear-pattern $e$, said opening $i$ having the projections or gear-teeth $j$ therein corresponding to the configuration and gear-teeth $e'$ of the pattern $e$, said gear-teeth $j$ fitting between the gear-teeth $e'$ of the pattern $e$. The frame $a$ has the opening $k$ in the bottom thereof for the passage of the plunger $b$ therein, and the molding-table $f$ is provided with the opening $l$ therein to allow for the movement of the pattern $e$ through the molding-table $f$.

In order to raise and lower the plunger $b$ and the pattern $e$, mounted thereon, there is provided the lever $m$, which is pivoted to the frame $a$ at $o$ and is removably secured to the plunger by means of a sliding connection formed by the bolt or bolts $n$ and the slot or slots $n'$ in the lever. The lever $m$ has at its free end a handle $p$ for operating the same. A decided advantage is obtained by means of this construction, as by it plungers of different lengths, to accommodate patterns of varying heights, may be readily inserted by merely unscrewing the bolts $n$ and removing the plunger through the bottom of the machine, the advantage lying in the fact that, no matter what size of pattern is employed, when the lever $p$ is depressed to its full extent the upper surface of the pattern will be at its proper level in the apparatus and about flush with the top of the stripping-plate or mold-plate, as preferred. The operator need therefore pay no attention as to how far he elevates or depresses the lever $p$, being certain always that when the lever has reached the full extent of its upward or downward stroke the pattern will be in the proper position for the subsequent steps in the operation of molding.

The operation of my improved molding apparatus is as follows: The plunger $b$, carrying the pattern $e$, being in its lowest position, as shown in Fig. 2, the operator grasps the handle $p$, lifting the lever $m$ and raising the plunger $b$, with its pattern $e$, up to the position shown in Fig. 3. The flask $g$ is then placed upon the molding-table $f$ around the pattern $e$ and resting upon the stripping-plate $h$. Sand is then placed within the flask $g$ and forced in and around the gear-teeth $e'$ of the pattern $e$ by the hands or in any other suitable manner. The projections or gear-teeth $j$ in the opening $i$ of the stripping-plate $h$ being between the gear-teeth $e'$ of the pattern $e$ prevents any sand from escaping from the flask around the pattern. After the flask has been entirely filled with sand and packed around the pattern $e$ the mold is made, and in order to withdraw the pattern $e$ all that is necessary is to grasp the handle $p$ of the lever $m$ and push or force down the same, which lowers the plunger $b$, with its pattern $e$, from the flask, the pattern $e$ sliding down through the projections or gear-teeth $j$ in the opening $i$ and the opening $l$ in the molding-table $f$, the plunger $b$ sliding down through the guides $c\ d$ and opening $k$ in the bottom of the frame $a$, and leaving the completed mold-cavity $g'$ in the flask $g$ upon the molding-table $f$. The flask $g$ is then carried and placed upon the foundry-floor, as shown in Fig. 5, and the cores $q\ q'$ placed therein, the shaft or central core $q$ resting in and centered by the seat $r$, formed by the nut $f'$. The cope-flask $s$, having the gate $t$, is then placed upon the drag-flask $g$ and bolted thereto, when the finished mold is ready for pouring. If desired, both of the devices for making gear-wheels and pinions may be operated at one time, and any number may be contained in the one apparatus, or the same can be used for the formation of different kinds of molds by the use of different kinds of patterns.

It will be seen that by my improved molding apparatus large numbers of these difficult molds may be made in a very short space of time and with great accuracy. It does not require experienced men, as the apparatus can be operated by unskilled workmen.

The apparatus is simple in its construction and will not get out of order.

What I claim as my invention, and desire to secure by Letters Patent, is—

1. The combination, in a molding apparatus, of a stationary frame, a stationary mold-table on said frame having an opening therein for the passage of the pattern therethrough, a plunger mounted in guides on said frame, a pattern mounted on the upper end of said plunger, a flask mounted on said mold-table, a slotted lever pivoted to the frame, and a screw bolt or bolts passing through the slot or slots in the lever and screwed into the plunger; substantially as described.

2. The combination, in a molding apparatus, of a stationary frame, a stationary molding-table on said frame having an opening therein for the passage of the pattern therethrough, a stripper-plate mounted on said molding-table also having an opening therein for the passage of the pattern, said opening in the stripper-plate corresponding in outline to the peripheral configuration of the pattern so as to support the sand while forming the mold, a plunger mounted in guides on said frame, a pattern mounted on the upper end of the plunger, a flask mounted on said stripping-plate, a slotted lever pivoted to the frame, and a screw bolt or bolts passing through the slot or slots in the lever and screwed into the plunger; substantially as described.

In testimony whereof I, the said FERDINAND KEPP, have hereunto set my hand.

FERDINAND KEPP.

Witnesses:
C. B. JOHNSTON,
J. N. COOKE.